(12) United States Patent
Alimario et al.

(10) Patent No.: US 9,450,276 B2
(45) Date of Patent: Sep. 20, 2016

(54) THERMAL GAP PAD FOR A PRISMATIC BATTERY PACK

(75) Inventors: Allan Alimario, Troy, MI (US); Jason R. Davis, Commerce Township, MI (US); Chad Allison, South Lyon, MI (US); Jonathan Hostler, Canton, MI (US); David Allen, Wixon, MI (US)

(73) Assignee: A123 Systems LLC, Waltham, MA (US)

( * ) Notice: Subject to any disclaimer, the term of this patent is extended or adjusted under 35 U.S.C. 154(b) by 345 days.

(21) Appl. No.: 14/112,112

(22) PCT Filed: Apr. 17, 2012

(86) PCT No.: PCT/US2012/033934
§ 371 (c)(1),
(2), (4) Date: Oct. 25, 2013

(87) PCT Pub. No.: WO2012/145314
PCT Pub. Date: Oct. 26, 2012

(65) Prior Publication Data
US 2014/0038012 A1    Feb. 6, 2014

Related U.S. Application Data

(60) Provisional application No. 61/476,939, filed on Apr. 19, 2011.

(51) Int. Cl.
*H01M 10/60* (2014.01)
*H01M 10/656* (2014.01)
*H01M 10/6567* (2014.01)
*H01M 10/6554* (2014.01)
*H01M 10/613* (2014.01)
*H01M 2/02* (2006.01)
*H01M 2/10* (2006.01)

(52) U.S. Cl.
CPC ....... *H01M 10/5061* (2013.01); *H01M 10/613* (2015.04); *H01M 10/656* (2015.04); *H01M 10/6554* (2015.04); *H01M 10/6567* (2015.04); *H01M 2/0217* (2013.01); *H01M 2/1061* (2013.01); *H01M 2/1077* (2013.01)

(58) Field of Classification Search
CPC .......... H01M 2/0217; H01M 2/1061; H01M 2/1077; H01M 10/613; H01M 10/6554; H01M 10/656; H01M 10/6567
See application file for complete search history.

(56) References Cited

U.S. PATENT DOCUMENTS

| | | | |
|---|---|---|---|
| 6,483,275 B1 | 11/2002 | Nebrigic et al. | |
| 2008/0280198 A1 | 11/2008 | Kumar et al. | |
| 2010/0104936 A1* | 4/2010 | Meintschel | H01M 2/06 429/120 |
| 2010/0104938 A1* | 4/2010 | Hermann | H01M 2/1077 429/120 |

OTHER PUBLICATIONS

Korean Intellectual Property Office, International Search Report of PCT/US2012/033934, WIPO, Oct. 25, 2012, 2 pages.

* cited by examiner

*Primary Examiner* — Brittany Raymond
(74) *Attorney, Agent, or Firm* — Alleman Hall McCoy Russell & Tuttle LLP

(57) ABSTRACT

A battery pack includes at least one voltaic cell module. A substrate is mechanically coupled to the module and configured to receive excess heat therefrom. A section of an electrically insulating thermal gap pad is arranged between the module and the substrate. The pad includes a dielectric sheet supporting a deformable layer.

19 Claims, 5 Drawing Sheets

THERMAL GAP PAD FOR A PRISMATIC BATTERY PACK

CROSS REFERENCE TO RELATED APPLICATIONS

This application claims priority from International Patent Application Serial No. PCT/US2012/033934, filed Apr. 17, 2012 and entitled THERMAL GAP PAD FOR A PRISMATIC BATTERY PACK, which claims priority to U.S. Provisional Patent Application Ser. No. 61/476,939, filed Apr. 19, 2011 and entitled THERMAL GAP PAD FOR A PRISMATIC BATTERY PACK, the entirety of both which are hereby incorporated herein by reference for all intents and purposes.

TECHNICAL FIELD

This application relates to the field of electrochemical engineering, and more particularly, to maintaining a prismatic battery pack at suitable operating temperatures.

BACKGROUND

A battery pack may include a plurality of voltaic cell modules connected in series for increased voltage or in parallel for increased current handling. During charging or discharging, the modules may evolve excess heat, which may be released to the ambient to avoid an over-temperature condition. At very low ambient temperatures, the modules of the battery pack may be supplied heat in order to achieve or maintain a suitable operating temperature.

The modules of a battery back may be coupled to a substrate that can absorb heat—e.g., a substrate that conducts flowing water. Efficient heat transfer between the modules and the substrate may require at least a partial filling of air gaps—gaps between the modules, gaps between the modules and the substrate, etc.—with a thermally conductive material. However, silicone greases and the like, which have been used as a gap filler, may be difficult to apply in a consistent manner and may not provide adequate dielectric isolation.

SUMMARY

Therefore, one embodiment of this disclosure provides a battery pack, which includes at least one voltaic cell module. A substrate is mechanically coupled to the module and configured to receive excess heat therefrom. A section of an electrically insulating thermal gap pad is arranged between the module and the substrate. The pad includes a dielectric sheet supporting a deformable layer.

The summary above is provided to introduce a selected part of this disclosure in simplified form, not to identify key or essential features. The claimed subject matter, defined by the claims, is limited neither to the content of this summary nor to implementations that address problems or disadvantages noted herein.

DETAILED DESCRIPTION

Figure 1:
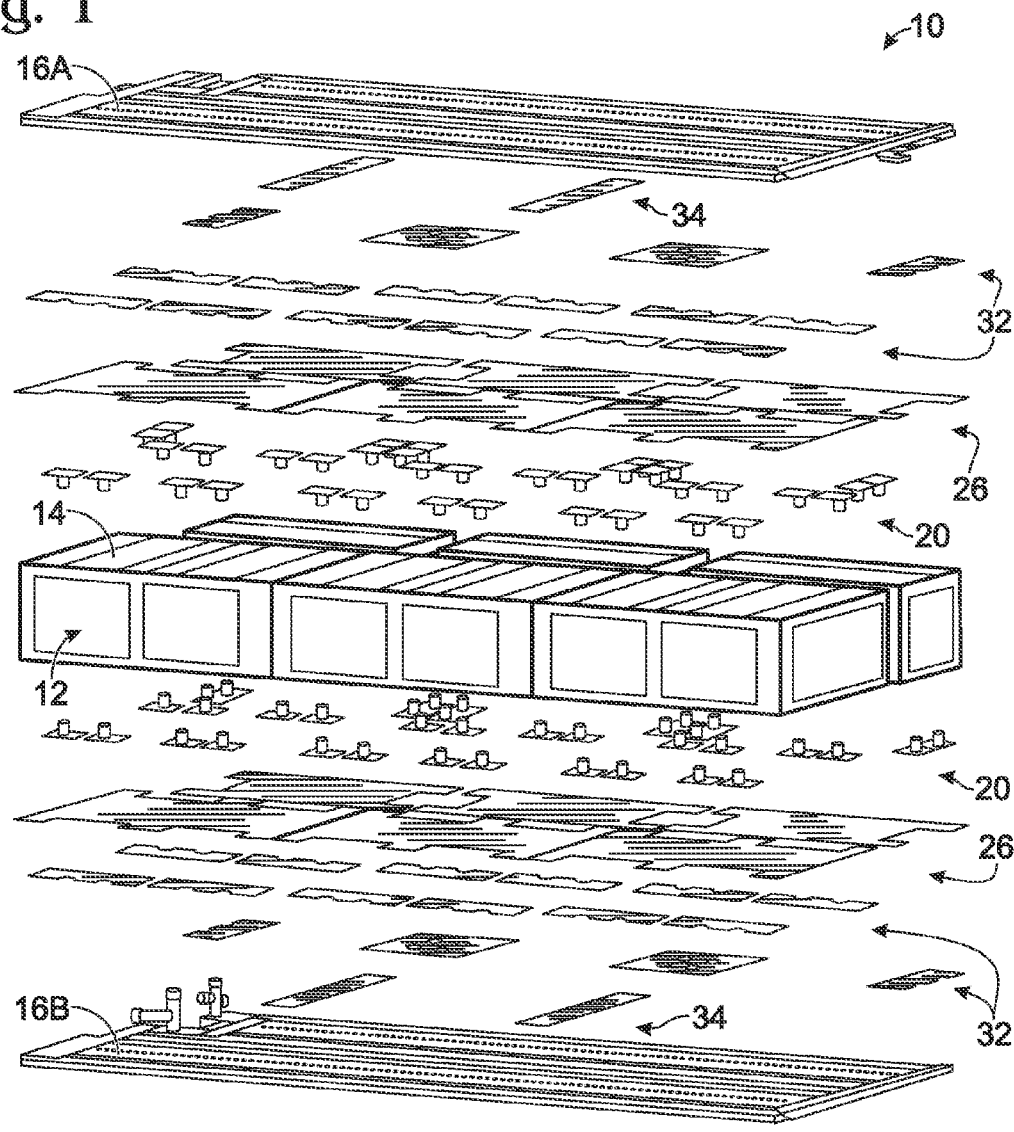
FIG. 1 shows aspects of an example battery pack in accordance with an embodiment of this disclosure.

Aspects of this disclosure will now be described by example and with reference to the illustrated embodiments listed above. Elements that may be substantially the same in one or more embodiments are identified coordinately and are described with minimal repetition. It will be noted, however, that elements identified coordinately may also differ to some degree. It will be further noted that the drawing figures included in this disclosure are based on engineering models and may be rendered to scale in one, non-limiting embodiment. In other embodiments, the relative dimensions of the illustrated features may vary.

FIG. 1 is an exploded view showing aspects of an example battery pack 10. In one embodiment, the battery pack may be used or included in an electrically driven or hybrid motor vehicle.

Battery pack 10 includes a plurality of voltaic cell modules 12, each having an exterior heat sink 14. Configured to draw heat from the interior of each module, the heat sink may be made of a thermally conductive material, such as aluminum. In the illustrated embodiment, each module is a prismatic voltaic cell module comprising at least one electrode oriented in a plane (hereinafter, 'the electrode plane'). The battery pack also includes first substrate 16A and second substrate 16B, both arranged parallel to the electrode plane. The first substrate is arranged at a first side of the plurality of modules, and the second substrate is arranged at a second side, opposite the first side. The substrates are mechanically coupled to each module and configured to receive excess heat therefrom. In other embodiments, one or both of the substrates may be orthogonal to the electrode plane.

Each substrate comprises a thermally conducting plate—i.e., a cold plate. The substrates may be made of a thermally conductive material, such as aluminum. Furthermore, one or both of the substrates may conduct a fluid. For example, the substrates may conduct a flow of water from a heat exchanger (not shown in the drawings). In this manner, the substrates may be configured to receive excess heat from the modules or to supply heat to the modules under conditions of low ambient temperature.

Figure 2:
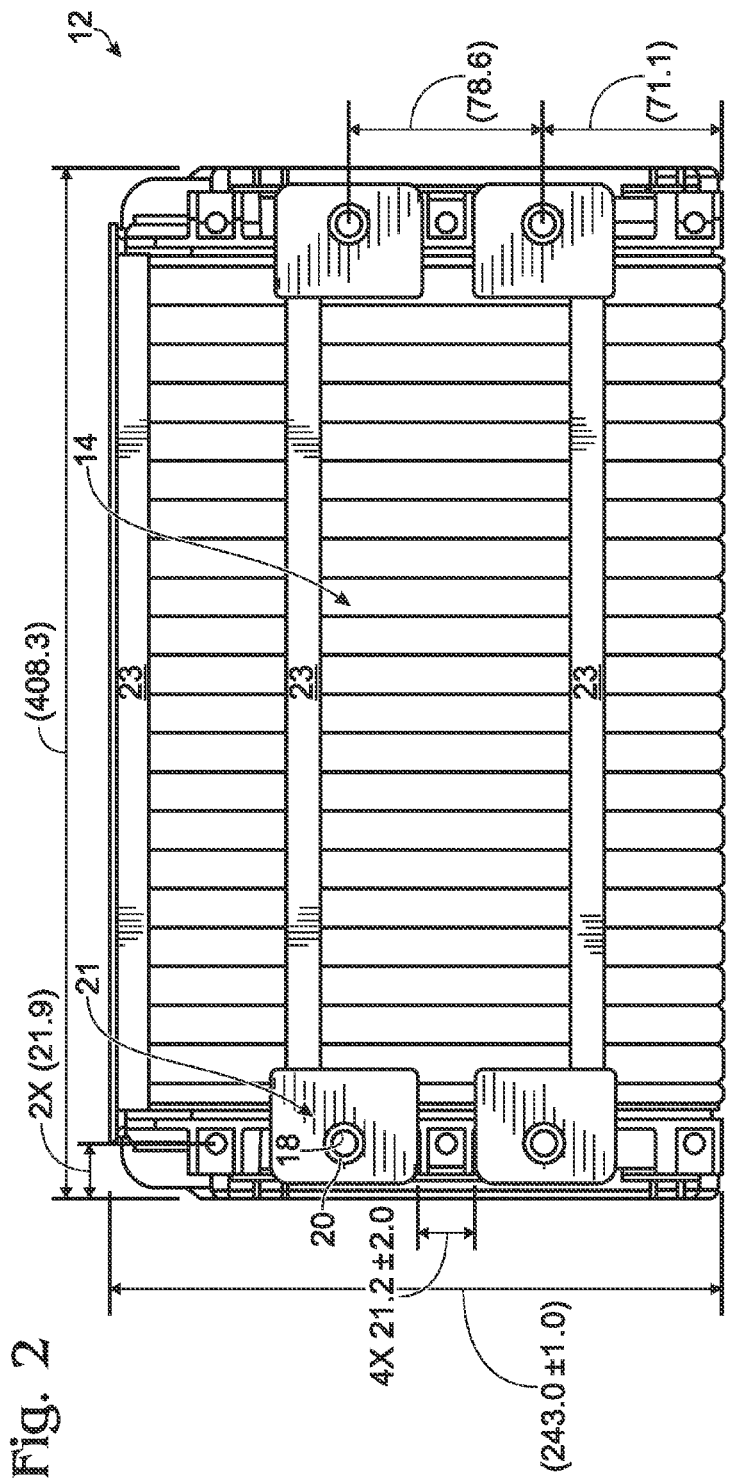
FIG. 2 shows aspects of an example module of a battery pack in accordance with an embodiment of this disclosure.

FIG. 2 is a plan view of one prismatic voltaic cell module 12 of battery pack 10. Each module of the battery pack includes a plurality of bushings 18 via which the module is coupled to the substrate. Each module also includes a corresponding plurality of bushing isolators 20. To accommodate the bushings and bushing isolators, each module includes a plurality of thru-holes 21 positioned in registry with the bushings. Each bushing isolator is configured to receive a bushing, to be received in a thru-hole, and to electrically and mechanically isolate the bushing from the module. FIG. 2 also shows module compression bands 23, which maintain module length and pressure under compression. The module compression bands may be fittably received in corresponding recesses formed in heat sinks 14 of the cell modules. In some embodiments, the module compression bands may comprise 304 stainless steel or another electrically conductive material.

Figure 3:
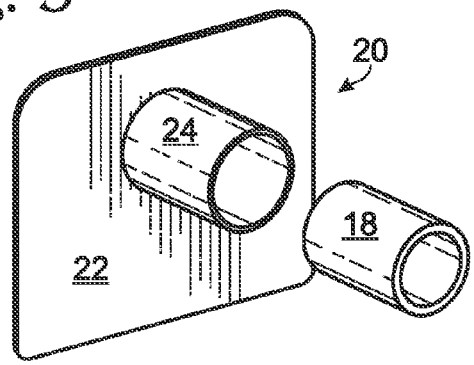
FIG. 3 shows a bushing and a bushing isolator in accordance with an embodiment of this disclosure.

FIG. 3 shows one embodiment of bushing 18 and bushing isolator 20 in greater detail. The bushing is the load bearing interface between module 12 and substrate 16A or 16B. The bushing also provides a fixed standoff between heat sink 14 and the substrate. A bushing may be made of any suitable material, including steel. In the embodiments shown herein, the bushings are cylindrical, but other geometries are contemplated as well.

To electrically isolate bushings 18, bushing isolator 20 may be formed from injection molded plastic—e.g., polypropylene or a polyamide such as nylon.

Figure 4:
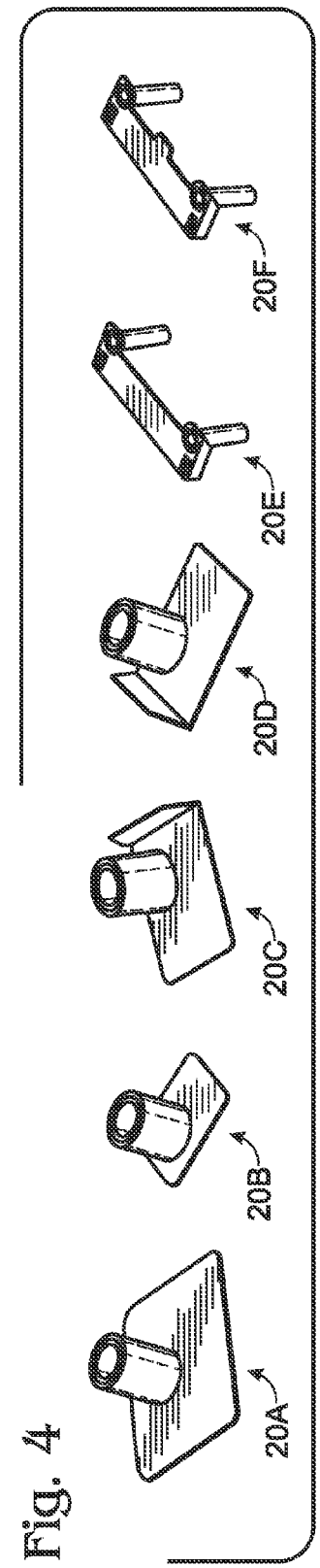
FIG. 4 shows additional bushing isolators in accordance with embodiments of this disclosure.

The bushing isolator includes a planar region 22 and a cylindrical region 24, with an axis of the cylindrical region oriented normal to the planar region. When installed in battery pack 10, the cylindrical region is fittably received in a thru-hole 21 of module 12, while the planar region faces substrate 16A or B, and is parallel to the substrate. FIG. 4 shows alternative bushing isolator embodiments, the particular bushing-isolator design being dependent on the orientation of the module—e.g., vertical or horizontal mount—and on the battery pack configuration.

Returning now to FIG. 1, battery pack 10 includes a plurality of sections of electrically insulating thermal gap pad 26. Each section is arranged between a module 12 and substrate 16A or B. For example, a thermal gap pad section may be arranged between heat sink 14 and the substrate. In this and other embodiments, additional sections of the thermal gap pad may be arranged elsewhere—between adjacent modules of the battery pack, for example.

Thermal gap pad 26 is a layered material configured to transfer heat between the structures on opposite sides of it, and to electrically isolate (i.e., insulate) such structures. The thermal gap pad effectively fills the gap between the structures, wholly or partly excluding air, which would otherwise limit heat conduction. In filling the gap, the thermal gap pad also serves a structural purpose, allowing cells, heat sink, and substrate to couple together more solidly with less applied compressive force, which reduces mechanical stress on the modules. Further, the thermal gap pad provides vibration dampening, which lowers the risk of resonance-induced strain in battery packs subject to vibration. With respect to each of the above features, the thermal gap pad is superior to silicone grease, especially in view of the repeated thermal cycling common to many battery packs. Such cycling could cause the grease to migrate over time, thereby admitting air into the gaps between the coupled structures.

Figure 5:
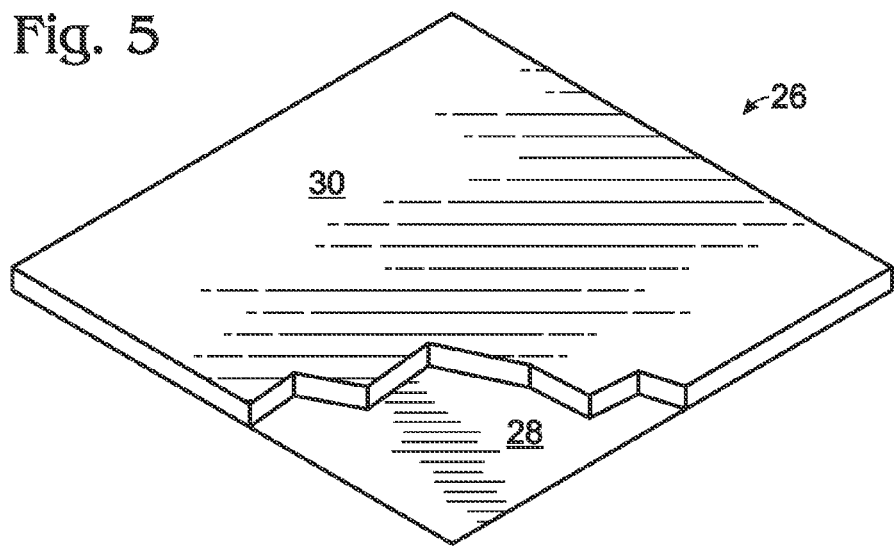
FIG. 5 shows an example structure of a thermal gap pad in accordance with an embodiment of this disclosure.

FIG. 5 shows an example structure of thermal gap pad 26 in greater detail. The thermal gap pad includes a dielectric sheet 28 supporting a deformable layer 30. The thermal gap pad may be installed in battery pack 10 with the deformable layer in contact with heat sinks 14 of the modules, while the dielectric sheet faces the substrate. In this manner, the thermal gap pad provides effective heat transfer and dielectric isolation at the interface between heat sink and substrate.

Dielectric sheet 28 provides dielectric isolation of module 12 from substrate 16A or B. The dielectric sheet may comprise one or more polymer materials: low-density polyethylene, polytetrafluoroethylene (PTFE), nylon, or silicone, for example. In one embodiment, the dielectric sheet may exhibit a dielectric strength greater than 5000 volts DC. The dielectric sheet may be mechanically robust, resisting damage due to thermal and/or mechanical stresses, including abrasion. The dielectric sheet may be a relatively thin material—e.g., 80 to 100 microns in thickness. It may exhibit a relatively high thermal conductivity. More particular thickness and conductivity ranges contemplated for this and other materials may be computed according to information set forth in the specification entitled "UL 840 Insulation Coordination Including Clearances and Creepage Distances for Electrical Equipment" ISBN 0-7629-1049-6 (hereinafter, UL-840), which is hereby incorporated by reference herein for all purposes.

Deformable layer 30 may be directly cast onto dielectric sheet 28, or bonded to the dielectric sheet by heat pressing, with the aid of an adhesive, or in any other suitable manner. In some embodiments, the deformable layer may be resiliently deformable. Accordingly, this layer is mechanically compliant, enabling it to fill the gaps between module and substrate. As noted above, the gap filling not only enhances heat transfer, but also provides improved vibration isolation and structural rigidity.

Deformable layer 30 may comprise an open-cell foam material—e.g., a silicone foam. In one non-limiting embodiment, a liquid—e.g., a silicone oil—may wholly or partly fill the cells of the foam. In these and other embodiments, the deformable layer may be formulated to provide good thermal conductivity—e.g., 3 Watts per meter-Kelvin at 298 Kelvins. Further, the material hardness of the deformable layer may set at a predetermined level so that it is deformable over a suitable pressure range while also protecting the dielectric sheet against rupture. In one embodiment, the deformable layer may be between 1.1 and 1.2 millimeters in thickness when not deformed. On installation, the interfacial pressure between heat sink 14 and thermal gap pad 26 is set to ensure proper heat transfer and mechanical robustness. Accordingly, bushing isolators 20 may be dimensioned to optimize the compression of the thermal gap pad in order to minimize thermal impedance.

Returning again to FIG. 1, the planar regions 22 of bushing isolators 20, together with complementary sections of the thermal gap pad 26, form a substantially contiguous, non-overlapping mosaic that separates module 12 from substrate 16A or B. This arrangement further reduces electrical creepage through bushings 18. In the embodiment shown in FIG. 1, battery pack 10 also includes a plurality of sections 32 of a dielectric barrier sheet configured to fit over the planar regions of the bushing isolators and to compensate for the difference in thickness between the thermal gap pad and the planar regions of the bushing isolators. The dielectric barrier sheet may comprise a substantially incompressible dielectric material, such as a polycarbonate resin thermoplastic. In one embodiment, the dielectric barrier sheet may support a pressure-sensitive adhesive to facilitate adhesion to the bushing isolators and/or thermal gap pad. In one embodiment, a pressure-sensitive adhesive may be applied, alternatively or additionally, to the substrates.

Battery pack 10 also includes a plurality of strips 34 of the dielectric barrier sheet, arranged between the thermal gap pad and the substrate over the gap between adjacent cell modules. The dielectric barrier sections and strips, together with bushing isolators 20 and thermal gap pad 26, serve to maintain electrical creepage distances between bushings 18 and other conductors—e.g., substrate 16A or B, heat sink 14, or other structures. More generally, the bushing isolators, thermal gap pad, and dielectric barrier sections and strips may be configured to electrically isolate virtually any conductor included in the battery pack—module compression bands 23, for example. The dielectric barrier sections and strips may be designed with different shapes, consistent with the different module and battery-pack geometries contemplated herein.

Figure 6:
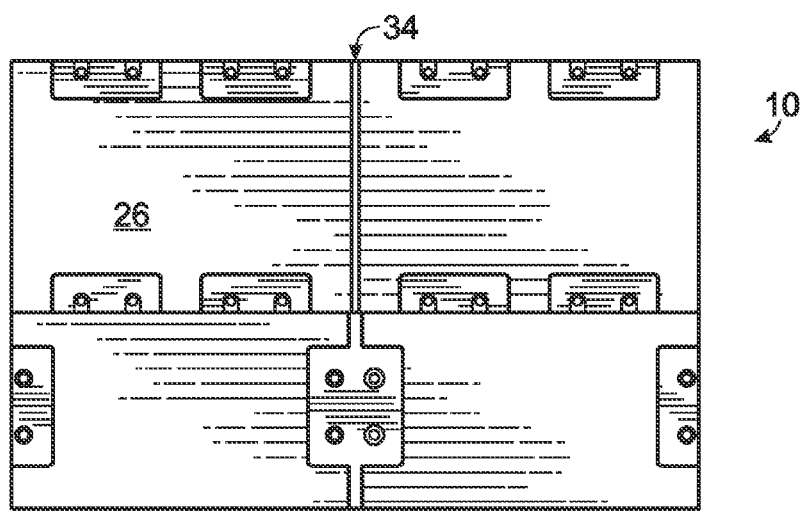
FIGS. 6 and 7 show additional aspects of an example battery pack in accordance with an embodiment of this disclosure.
Figure 7:
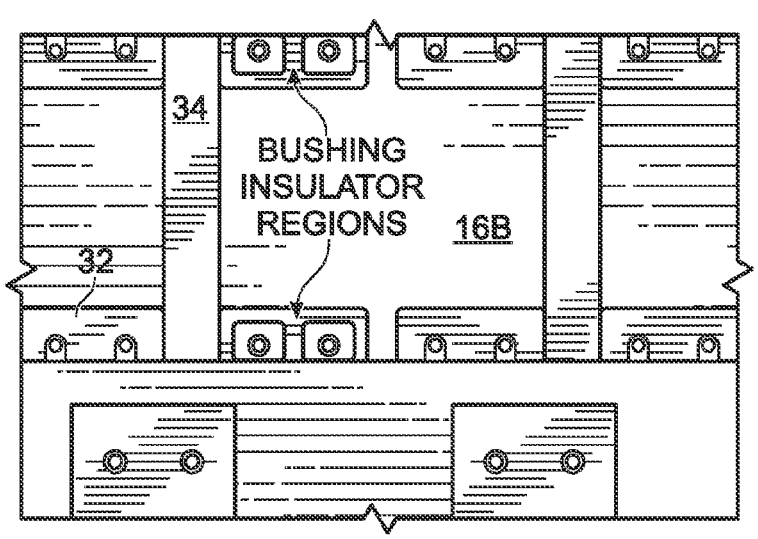

FIG. 6 is a top view of the embodiment of FIG. 1 with substrate 16A removed. FIG. 7 shows a more detailed view of sections 32 and strips 34 of the dielectric barrier sheet with the modules and thermal gap pad sections removed.

Figure 8A:
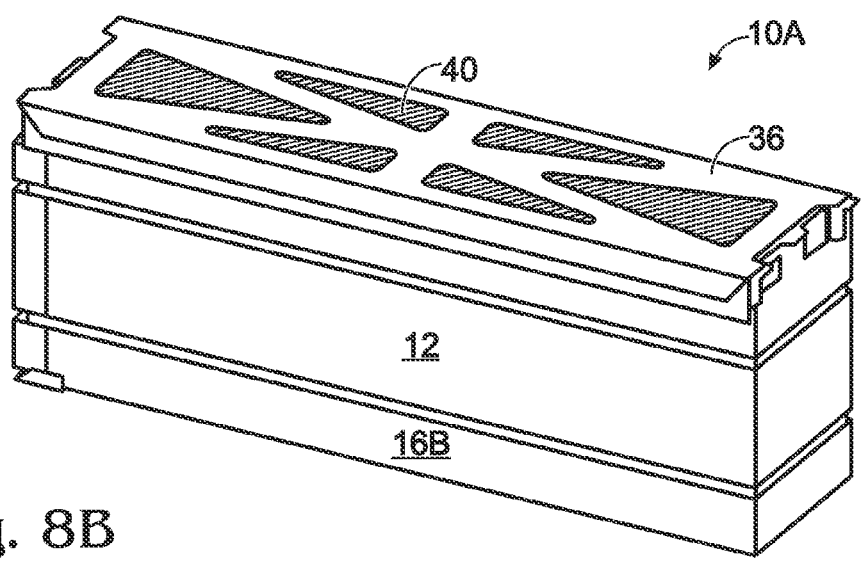
FIGS. 8A, 8B, and 8C show aspects of an example battery pack with vertically mounted modules in accordance with an embodiment of this disclosure.

In the embodiments described hereinabove, substrates 16A and B were arranged parallel to the horizontal electrode plane of modules 12. In other embodiments, the electrode plane may be oriented vertically in each of the modules, and a single substrate may be arranged orthogonal to the electrode plane—i.e., below the modules, as shown in FIG. 8A. This drawing shows a battery pack 10A with vertically mounted modules 12. As in the previous embodiments, the modules may be coupled to the substrate using sections of thermal gap pad 26 and bushing isolators 20.

Figure 8B:
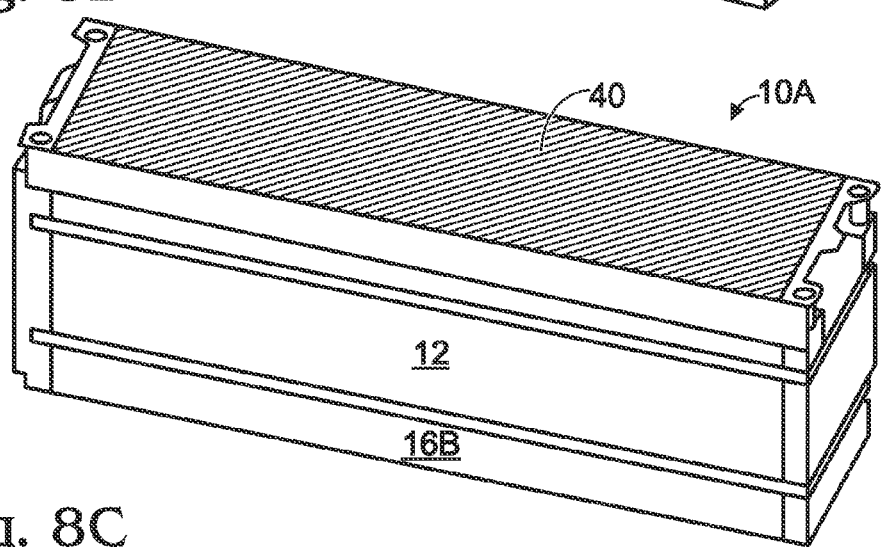
Figure 8C:
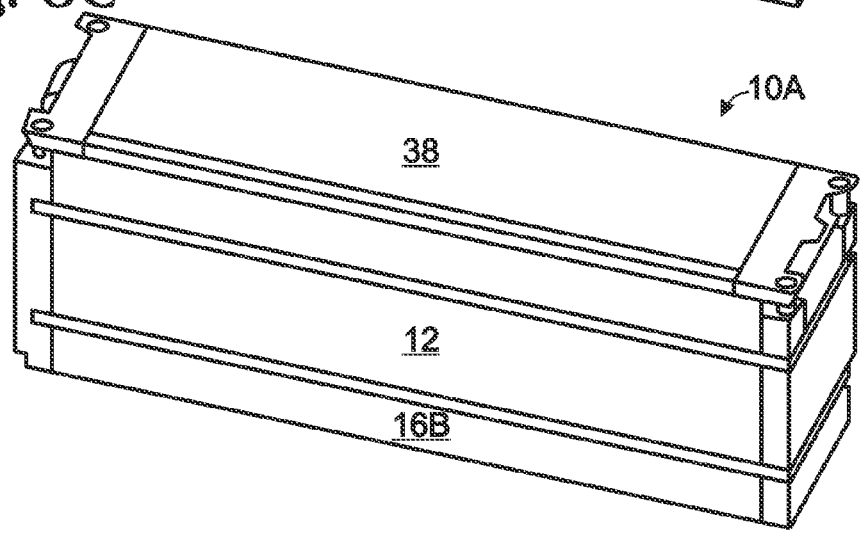

In FIG. 8A, a cage section 36 is arranged over top of modules 12, to provide structure to the module assembly of the battery pack. As such, the cage section may be made of steel. FIG. 8B shows the embodiment of FIG. 8A with the cage section removed, thereby exposing a section of substantially incompressible dielectric sheet material 40. The dielectric sheet material isolates the vertically mounted modules, module terminals, and buss bars from the conductive cage section. FIG. 8C shows the embodiment of FIG. 8B with dielectric sheet material 40 removed, thereby exposing buss bar cover 38. The bus bar cover is disposed over at least one electrode terminal of the module and beneath the dielectric sheet material.

Figure 9A:
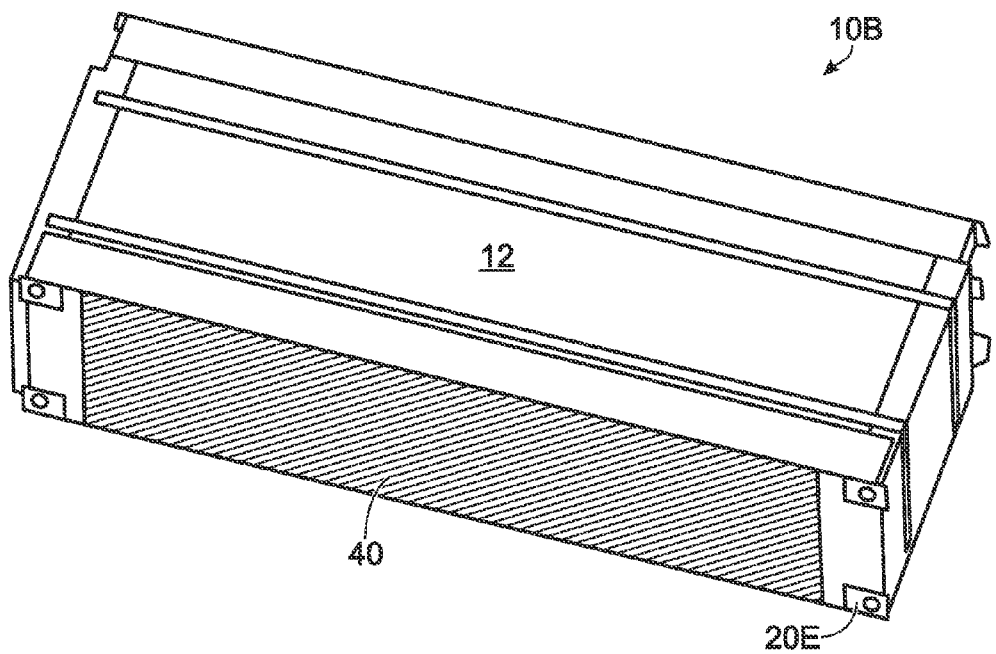
FIGS. 9A and 9B show aspects of an example non-thermal battery pack in accordance with an embodiment of this disclosure.
Figure 9B:
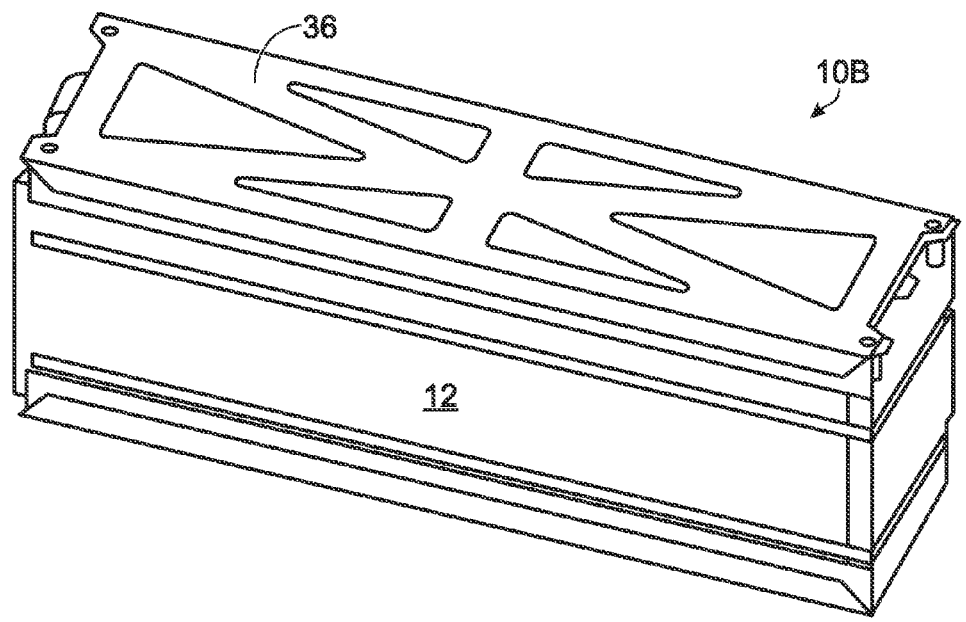

FIG. 9A shows a vertically mounted module 12 in non-thermal battery pack 10B. This assembly may retain an overall similar construction as the battery packs described hereinabove. It may include dielectric sheet material 40 at the bottom of the module, along with dielectric bushing isolators 20E. FIG. 9B shows the embodiment of FIG. 9A rotated, with cage section 36 installed.

It will be understood that the articles, systems, and methods described hereinabove are embodiments of this disclosure—non-limiting examples for which numerous variations and extensions are contemplated as well. Accordingly, this disclosure includes all novel and non-obvious combinations and sub-combinations of the articles, systems, and methods disclosed herein, as well as any and all equivalents thereof.

The invention claimed is:

1. A battery pack comprising:
a voltaic cell module;
a substrate mechanically coupled to the module and configured to receive excess heat from the module; and
a section of an electrically insulating thermal gap pad arranged between the module and the substrate, the pad including a dielectric sheet supporting a deformable layer,
wherein the electrically insulating thermal gap pad is configured to increase structural rigidity of the battery pack, and
wherein the deformable layer is arranged in contact with a heat sink of the module and the dielectric sheet is arranged in contact with the substrate.

2. The battery pack of claim 1 wherein the dielectric sheet is between 80 and 100 microns in thickness.

3. The battery pack of claim 1 wherein the dielectric sheet exhibits a dielectric strength of five thousand volts or greater.

4. The battery pack of claim 1 wherein the deformable layer is resiliently deformable.

5. The battery pack of claim 1 wherein the deformable layer comprises a foam.

6. The battery pack of claim 1 wherein the deformable layer is between 1.1 and 1.2 millimeters in thickness when not deformed.

7. The battery pack of claim 1 wherein the deformable layer is cast directly on the dielectric sheet.

8. The battery pack of claim 1 wherein the module includes an exterior heat sink, and wherein the thermal gap pad section is arranged between the exterior heat sink and the substrate.

9. The battery pack of claim 1 wherein the substrate conducts a fluid.

10. The battery pack of claim 1 wherein the module is a prismatic voltaic cell module comprising at least one electrode oriented in a plane, and wherein the substrate includes a thermally conducting plate.

11. A battery pack comprising:
a voltaic cell module;
a substrate mechanically coupled to the module and configured to receive excess heat from the module;
a section of an electrically insulating thermal gap pad arranged between the module and the substrate, the pad including a dielectric sheet supporting a deformable layer, wherein the electrically insulating thermal gap pad is configured to increase structural rigidity of the battery pack, and wherein the deformable layer is arranged in contact with a heat sink of the module and the dielectric sheet is arranged in contact with the substrate;
a bushing via which the module is coupled to the substrate, the module including a thru-hole positioned in registry with the bushing; and
a bushing isolator configured to receive the bushing, to be received in the thru-hole, and to electrically and mechanically isolate the bushing from the module.

12. The battery pack of claim 11 wherein the bushing is cylindrical;
wherein the bushing isolator includes a planar region and a cylindrical region, an axis of the cylindrical region oriented normal to the planar region;
wherein the cylindrical region is fittably received in the thru-hole of the module, and
wherein the planar region faces the substrate and is parallel to the substrate.

13. The battery pack of claim 12 wherein the bushing isolator is one of a plurality of bushing isolators received in a corresponding plurality of thru-holes of the module;
and wherein the planar regions of the plurality bushing isolators together with complementary sections of the thermal gap pad form substantially contiguous, non-overlapping mosaic that separates the module from the substrate.

14. The battery pack of claim 12 further comprising a section of a dielectric barrier sheet configured to fit over the planar region of the bushing isolator and to compensate for a difference in thickness between the section of the thermal gap pad and the bushing isolator.

15. A battery pack comprising:
a prismatic voltaic cell module having at least one electrode oriented in a plane;
a substrate having a thermally conducting plate arranged parallel to the plane, mechanically coupled to the module, and configured to receive excess heat from the module; and a section of an electrically insulating thermal gap pad arranged between the module and the substrate, the pad including a dielectric sheet supporting a deformable layer, wherein the electrically insulating thermal gap pad is configured to increase structural rigidity of the battery pack, and wherein the deformable layer is arranged in contact with a heat sink of the module and the dielectric sheet is arranged in contact with the substrate.

16. The battery pack of claim 15 wherein the module is arranged substantially horizontally.

17. The battery pack of claim 15 wherein the substrate is a first substrate arranged at a first side of the module, the battery pack further comprising a second substrate parallel to the plane and arranged at a second side of the module, opposite the first side.

18. The battery pack of claim 15 wherein the module is one of a plurality of cell modules coupled to the substrate, the battery pack further comprising strips of a dielectric barrier sheet arranged between the section of the thermal gap pad and the substrate over a gap between adjacent modules.

19. The battery pack of claim 15 wherein the substrate is further configured to supply heat to the module.

* * * * *